United States Patent [19]

Ratner

[11] Patent Number: 5,533,033
[45] Date of Patent: Jul. 2, 1996

[54] DEVICE FOR AND METHOD OF CORRECTING ERRORS IN FORMATTED MODEM TRANSMISSIONS

[75] Inventor: Alan S. Ratner, Clarksville, Md.

[73] Assignee: The United States of America as represented by the Director, National Security Agency, Washington, D.C.

[21] Appl. No.: 359,313

[22] Filed: Dec. 19, 1994

[51] Int. Cl.⁶ .................................................. H04L 1/00
[52] U.S. Cl. ................................................ 371/30; 371/43
[58] Field of Search .......................... 371/30, 39.1, 37.1, 371/43, 45

[56] References Cited

U.S. PATENT DOCUMENTS

| | | | |
|---|---|---|---|
| 3,613,077 | 10/1971 | Forney, Jr. | 371/30 |
| 4,760,576 | 7/1988 | Sako | 371/40 |
| 5,010,554 | 4/1991 | Bechtel et al. | 371/37.1 |

*Primary Examiner*—Stephen M. Baker
*Attorney, Agent, or Firm*—Robert D. Morelli; Thomas O. Maser

[57] ABSTRACT

The present invention discloses a device for and method of correcting an error in a formatted modem transmission by receiving a formatted modem transmission into a receiving modem, identifying the formatting scheme of the transmission, testing the transmission to determine if a formatting error is contained therein, generating error patterns and associated correction patterns for the receiving modem based upon the format of the transmission and the type of descrambler used in the receiving modem, searching the transmission to determine if any of the generated error patterns is found therein, and replacing any error pattern found in the transmission with its associated correction pattern.

6 Claims, 6 Drawing Sheets

| SYMBOL1 | SYMBOL2 | ERRORS CAUSED BY DESCRAMBLER |
|---------|---------|------------------------------|
| - X | - X | - - - X X X X - |
| - X | X - | - - - X - X - - |
| X - | - X | - - X X - X X - |
| X - | X - | - - X X X X - - |

| SYMBOL1 | SYMBOL2 | ERRORS CAUSED BY DESCRAMBLER |   |   |
|---------|---------|---|---|---|
| - - X | - - X | - - X | X - X | X - - |
| - - X | - X - | - - X | X X X | - - - |
| - - X | X - - | - - X | - X - | - - - |
| - X - | - - X | - X X | - - X | X - - |
| - X - | - X - | - X X | - X X | - - - |
| - X - | X - - | - X X | X X - | - - - |
| X - - | - - X | X X - | - - X | X - - |
| X - - | - X - | X X - | - X X | - - - |
| X - - | X - - | X X - | X X - | - - - |

| SYMBOL1 | SYMBOL2 | ERRORS CAUSED BY DESCRAMBLER |
|---|---|---|
| - - X | - - X | - - -   - - -   - - -   - - -   - - X   - - X   - X -   - X - |
| - - X | - X - | - - -   - - -   - - -   - - -   - - X   - X -   - X -   X - - |
| - - X | X - - | - - -   - - -   - - -   - - -   - - X   X - -   - X X   - - - |
| - X - | - - X | - - -   - - -   - - -   - - -   - X - 　- X   X - -   - X - |
| - X - | - X - | - - -   - - -   - - -   - - -   - X -   - X -   X - -   X - - |
| - X - | X - - | - - -   - - -   - - -   - - -   - X -   X - -   X - X   - - - |
| X - - | - X - | - - -   - - -   - - -   - - -   X - -   - X X   - - -   X - - |
| X - - | X - - | - - -   - - -   - - -   - - -   X - -   X - X   - - X   - - - |
| X - - | - - X | - - -   - - -   - - -   - - -   X - -   - - -   - - -   - X - |
| - X X | - X X | - - -   - - -   - - -   - - -   - X X   - X X   X X -   X X - |
| - X X | X - X | - - -   - - -   - - -   - - -   - X X X   - X   X X X   - X - |
| X - X | - X X | - - -   - - -   - - -   - - -   X - X   - X -   - X -   X X - |
| X - X | X - X | - - -   - - -   - - -   - - -   X - X   X - -   - X X   - X - |

FORMATTED MODEM TRANSMISSION

DETECT ERRORS IN THE FORMATTED MODEM TRANSMISSION

GENERATE THE MOST LIKELY ERROR PATTERNS AND ASSOCIATED CORRECTION PATTERNS FOR THE RECEIVING MODEM

IDENTIFY THE ERROR PATTERN IN THE FORMATTED MODEM TRANSMISSION

CORRECT THE ERRORS IN THE FORMATTED MODEM TRANSMISSION

ERROR-LESS FORMATTED MODEM TRANSMISSION

FIG. 5

DEVICE FOR AND METHOD OF CORRECTING ERRORS IN FORMATTED MODEM TRANSMISSIONS

FIELD OF THE INVENTION

The present invention relates to error correction and, more particularly, to digital data error correction of formatted modem transmissions.

BACKGROUND OF THE INVENTION

Communication entails the transfer of information from one point to another. A communication may be transmitted in many forms (e.g., voice, data, video, facsimile). Communication of digital data is usually done by code. A code is a set of characters (e.g., Morse code, American Standard Code for Information Interchange (ASCII)). Typically, each character in a code consists of binary bits.

Noise is any unwanted signal that might interfere with the intended communication. Examples of noise include a waveform that covers the frequency band of the particular communication channel over which the communication is transmitted, a voltage impulse signal (i.e., a voltage spike), interference (i.e., crosstalk) from one communication channel to another, a single frequency tone, interference with the communication by itself (i.e., an echo). Noise may result in the modification of one or more of the binary bits that make up the communication.

Prior to transmitting a signal, a modulator-demodulator (modem) converts a digital signal to an analog signal. Upon receiving an analog signal, a modem converts the analog signal to a digital signal. Some modems format the data in a digital signal in one way or another prior to converting the digital signal to an analog signal for subsequent transmission. For example, the data may be framed, or packetized, so that a cyclic redundancy check can be used by the recipient of the transmission to determine if the signal received is the same as the signal sent. Such a check helps the recipient determine if an error occurred in the data. Also, a facsimile transmission may be formatted so that 1) only a certain number of picture elements occur per scan line, 2) only valid compression codes are used, 3) an end-of-line code occurs at the end of each scan line, and 4) a high correlation of black picture elements exist from scan line to scan line. Furthermore, the binary bits may be restricted to a certain set of values (e.g., ASCII characters restricted to a range of binary values that is less than the maximum range of 0 to 255). These are only a few examples of how a modem transmission may be formatted. The present invention can be applied to other formatting methods and is, therefore, not limited by the particular formatting method employed.

Typically, communications transmitted using quadrature amplitude modulated (QAM) modems are transmitted as a series of symbols. Each symbol may consist of several binary bits. The symbols can be visualized as points on a two-dimensional x-y plot (i.e., a constellation). Each point has a fixed bit assignment. The assignments are usually chosen so that adjacent symbols differ in only one bit position. For example, the zero degree point, the 90 degree point, the 180 degree point, and the 270 degree point on a unit circle may be represented by the following symbols: 00, 01, 11, 10 respectively. Note that the zero degree point and the 270 degree point also differ in only one bit position. Typically, symbols are chosen to maximize the distance between adjacent symbols. These two steps reduce the likelihood that one symbol will be mistaken for another. Exactly how this reduced likelihood is achieved is discussed below.

When a symbol is received, its position in the constellation is measured, and it is assigned the bit sequence of the closest point in the constellation. By maximizing the distance between adjacent constellation points, an error in a symbol may result in a measurement that is sufficiently close to the intended constellation point that the error does not prevent the symbol from being assigned the correct bit sequence. But an error in a symbol may result in a measurement that is so far away from the intended constellation point that the intended symbol will be mistaken for an unintended constellation point and assigned an incorrect bit sequence (i.e., the bit sequence for the unintended constellation point).

Some modems use differential phase coding which indicates whether or not there has been a change of phase between adjacent symbols. If the phase of one symbol is mistaken, a mistake will be made in the next symbol.

Typically, a communication is not transmitted "as is" because it may contain long strings of binary ones or zeros. These long strings will make it difficult to accurately count the ones or zeros, and these long strings may be mistaken for a control signal (e.g., start signal, stop signal, etc.). Also, a repetitive pattern within a communication may produce a strong frequency component that may interfere with the communication. For these reasons, a communication is scrambled prior to transmission and descrambled upon reception.

Typically, a scrambler is a pseudo-random linear sequence generator consisting of a shift-register having a number of outputs (i.e., taps) connected to an exclusive-or gate. The output of the exclusive-or gate is logically fed back into the input of the shift-register to create the pseudo-random linear sequence. A communication is scrambled by logically combining the output of the exclusive-or gate with the binary bits of the communication. Each uniquely configured pseudo-random linear sequence generator can be described, mathematically, by a polynomial (e.g., $1+x^{}-6+x^{}-7$).

Descrambling is achieved by creating a mirror image of the scrambling process. Since the descrambler contains a shift-register, an erroneous bit lingers in the shift-register until it is shifted out. Therefore, an erroneously descrambled bit will cause additional errors until the erroneous bit is shifted out of the shift-register. Note that each of the subsequently produced error-bits also linger for the same duration.

As noted above, noise may introduce bit-errors in the communication. Typically, these errors are corrected by toggling the received bits until a determination is made that the error has been corrected. This exhaustive-search-type method of correcting errors can be extremely time-consuming. Also, such a method would be unsuccessful if the time required to correct an error exceeds the mean time between failure of the error-correction device.

The present invention discloses a device for and method of correcting bit errors in a formatted modem transmission that does not employ an exhaustive-search scheme. It is believed that the present invention corrects errors faster than could be done using an exhaustive-search scheme. Also, the increased performance obtained by the present invention may result in the correction of errors that cannot be corrected using an exhaustive-search scheme.

U.S. Pat. No. 4,760,576, entitled "ERROR CORRECTION METHOD," discloses a method of correcting errors that occur in data that is arranged in rows and columns. The errors are corrected by adding an error correction code to the previously known codes for correcting row errors and column errors. The present invention does not rely on any of these codes to correct errors. The present invention corrects errors by generating error patterns and correction patterns based on a method of reducing the error-search tree.

U.S. Pat. No. 5,010,554, entitled "ERROR CORRECTION METHOD AND APPARATUS," discloses a device for and method of correcting errors that is faster than devices and methods that use an overall parity bit. U.S. Pat. No. 5,010,554 divides the data to be corrected into a significant part and an insignificant part. A parity bit is provided for the significant part. Doing a parity check on the significant part reduces the number of computations needed to correct the errors in the data. The present invention does not rely on parity bits to correct errors. The present invention looks at the receiving modem as being the source of any error. Therefore, the present invention characterizes the receiving modem so that error patterns can be identified and corrected quickly.

SUMMARY OF THE INVENTION

It is an object of the present invention to correct errors in a formatted modem communication.

It is another object of the present invention to correct errors in a formatted modem communication in a manner that is more efficient than can be done using an exhaustive-search scheme.

It is another object of the present invention to correct errors in a formatted modem communication that, possibly, cannot be done by an exhaustive-search scheme.

The present invention discloses a device for and method of correcting errors in formatted modem data that is based on the realization that 1) errors are the result of incorrect symbol decisions made by the receiving modem, 2) errors may be extended by differential phase coding, 3) errors are extended by the descrambler of the receiving modem, and 4) correct data must obey the formatting rules of the transmitting modem.

The typical exhaustive-search method for correcting errors is time consuming and, in some instances, impossible.

The present invention identifies those error patterns that are most likely to occur and searches for only these errors. The present invention is highly efficient, as compared to an exhaustive-search scheme, because a much smaller number of possible errors are considered.

Quadrature amplitude modulated (QAM) modem data is transmitted as symbols consisting of several bits each. Each received symbol is measured and assigned the bit sequence of the closest constellation point.

An error occurs when noise causes the received symbol to be measured as being closer to an unintended constellation point. The result is that the received symbol will be assigned the wrong bit sequence.

If differential phase coding is used, an error in one symbol may cause an error in the next symbol. For example, a modem having one constellation point at each phase will contain an error in a symbol following an erroneous symbol. If a modem has more than one constellation point at each phase, then the symbol following an erroneous symbol may not, necessarily, be erroneous (i.e., a second error will not occur if a symbol is mistaken for a symbol having the same phase but different amplitude).

Transmitting modems use a scrambler circuit to avoid transmitting long strings of ones or zeros which are difficult to count and may be mistaken for a control signal. The receiving modem uses a descrambling circuit to descramble the transmission. The descrambler will extend a single error to a number of errors that is defined by the type of descrambler used.

The method of the present invention consists of identifying the formatting scheme used by the transmitting modem, checking the received data to determine if any errors are contained therein, generating the possible error patterns and associated correction patterns for the receiving modem, identifying the type and location of each error, and replacing each error with its associated correction pattern.

The present invention outperforms exhaustive-search type error-correction schemes.

Commercially available programmable devices such as microprocessors can be programmed to perform each step of the above-identified method.

BRIEF DESCRIPTION OF THE DRAWINGS

FIG. 5 is a block diagram of the method of the present invention.

DETAILED DESCRIPTION

The present invention discloses a device for and method of correcting errors in formatted modem data. Error correction in the present invention is based on the realization that 1) errors are the result of incorrect symbol decisions made by the receiving modem during the demodulation of the transmission, 2) errors may be extended by differential phase coding, 3) errors are extended by the descrambler of the receiving modem, and 4) correct data must obey the formatting rules of the transmitting modem.

The typical method of correcting errors in modem data is to assume that errors occurred in the transmission process and that such errors resulted in bit errors. Attempts were then made to toggle various bits in the transmission until the errors were corrected. Such an exhaustive-search method is time consuming and, in some instances, impossible. For example, the time to perform an exhaustive-search may exceed the mean time between failures of the device used to perform the search.

The present invention identifies those error patterns that are most likely to occur and searches for only these errors. The present invention is highly efficient, as compared to an exhaustive-search scheme, because a much smaller number of possible errors are considered. It is believed that the error patterns considered include the errors that are most likely to occur.

Figure 1:
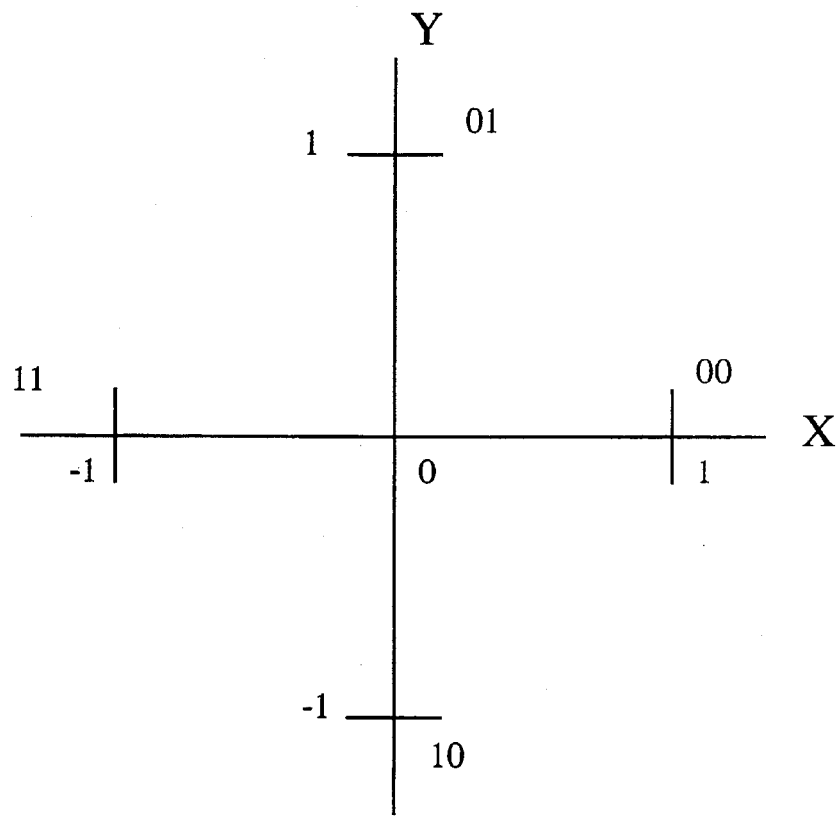
FIG. 1 illustrates the constellation and error patterns for a V.27 ter modem at 2400 bits per second.

Quadrature amplitude modulated (QAM) modem data is transmitted as symbols consisting of several bits each. The symbols can be visualized as points on a two-dimensional x-y plot known as a constellation. Such a plot is illustrated in FIG. 1. Each point in the constellation has a fixed bit assignment. When a symbol is received, its position in the constellation is measured. This measurement is compared to each constellation point. The bit sequence of the constellation point closest to the measurement is assigned to the received symbol.

An error occurs when noise, usually in the communication channel, causes the received symbol to be measured as being closer to an incorrect constellation point than to the correct (i.e., intended) constellation point. For example, in FIG. 1, constellation point, i.e., x-y coordinate, (1,0) is assigned the bit sequence (i.e., symbol) 00 while constellation point (0,1) is assigned the bit sequence 01. Note that numbers within parenthesis represent x-y coordinate, i.e., constellation, points where numbers without parenthesis represent symbols. If the transmitting modem sends bit sequence 01, intending to indicate that the correct constellation point is (0,1), and noise causes the receiving modem to identify the transmission as 00 (i.e., a one-bit error) then the erroneously received bit sequence will be identified as being closer to constellation point (1,0) than to the intended constellation point (0,1). The result will be that the received symbol will, erroneously, be assigned the bit sequence 00 instead of the correct bit sequence 01.

Some modems use differential phase coding. These modems employ a code that indicates the difference in phase between a transmitted symbol and a previously transmitted symbol. Therefore, if noise causes the phase of a symbol to be erroneously identified then the difference in phase between that symbol and the next symbol will also be in error. For example, FIG. 1 depicts a constellation having four points (i.e., (1,0), (0,1), (−1,0), and (−1,−1), where each point is at a different phase (i.e., 0 degrees, 90 degrees, 180 degrees, and 270 degrees respectively). In the example above, 01 was sent, and it was erroneously identified as 00. The error not only resulted in a symbol misidentification but also a phase misidentification (i.e., 0 degrees when 90 degrees was intended). If 00 is the next symbol sent and it is received correctly the receiving modem will indicate a phase difference of zero between the first erroneously identified symbol 00 and the second correctly identified symbol 00 when, in fact, a phase difference of −90 degrees was intended. Therefore, a symbol error in a differential modem may cause an error in the next symbol (i.e., differential modem errors may occur in pairs).

Transmitting modems use pseudo-random linear sequence generators to scramble the transmission so that long strings of ones or zeros do not occur. The receiving modem contains a descrambling circuit that descrambles the transmission. Typically, the descrambling circuit consists of a shift-register and two exclusive-or gates. The outputs of various stages of the shift-register are connected to a first exclusive-or gate. The scrambled data is fed into the shift-register. The output of the first exclusive-or gate and the scrambled data are then connected to a second exclusive-or gate. The output of the second exclusive-or gate is descrambled data.

The positions of the taps to the shift-register determines the polynomial that mathematically describes the descrambler. For example, if stages six and seven of the shift-register were tapped, the descrambler would be described by the polynomial $1+(x^{}-6)+(x^{}-7)$.

If a received symbol is erroneously assigned a bit sequence, the erroneous bits linger in the descrambler shift-register until they are shifted out. These erroneous bits will generate additional errors. For example, an error introduced into a descrambler that can be described by the polynomial $1+(x^{}-6)+(x^{}-7)$ will cause the subsequent sixth and seventh bits to be in error. This is a known as error extension.

The degree to which an error is extended is defined by the descrambler polynomial.

The net result is that an error that is introduced into a descrambler will cause a burst of errors over a limited number of bits. If the modem is a differential modem, one error may result in a pair of errors. Each of these errors will be extended by the descrambler.

The simplest illustration of the present invention uses a V.27 ter modem at 2400 bits per second (BPS). This modem is defined in 4800/2400 *Bits Per Second Modem Standardized For Use In The General Switched Telephone Network*, Recommendation V.27 ter of the International Telegraph and Telephone Consultive Committee (CCITT) of the International Telecommunication Union (ITU).

The data in a 2400 BPS V.27 ter modem is sent as Quadrature Phase Shift Keyed (QPSK) which entails four points in a constellation as illustrated in FIG. 1. These four points can be envisioned as four equally spaced points along a unit circle at 0 degrees, 90 degrees, 180 degrees, and 270 degrees or in x-y coordinates (i.e.,(x,y)) as (1,0), (0,1), (−1,0), and (0,−1) respectively. Each of these four points is assigned a two-bit symbol. That is, (1,0) is assigned 00, (0,1) is assigned 01, (−1,0) is assigned 11, and (0,−1) is assigned 10.

Based on the x-y coordinates, the distance between nearest neighbors is 1.414 while the distance between points on opposite sides of the unit circle is 2. Since the symbols of nearest neighbors differ by only one bit position, noise that causes a near-neighbor misidentification will cause a one-bit error in a symbol. Near-neighbor misidentification is believed to be the most common type of error. Therefore, most errors are corrected by replacing the erroneous bit assignment with the bit assignment of one of its nearest neighbors. For example, constellation point (1,0) has two nearest neighbors (i.e.,(0,1) and (−1,0)). If (1,0) is misidentified, it will, most likely, be misidentified as either (0,1) or (−1,0). The result is that the intended symbol 00 will be misidentified as either 01 or 10.

If a dash (i.e., "-") is used to identify bits that are correct and the letter "x" is used to identify bits that are incorrect, the two possible errors described in the preceding paragraph can be represented as either "-x" or "x-." That is, "-x" represents the situation where the first bit is correct and the second bit is incorrect (e.g., 00 is misidentified as 01). And "x-" represents the situation where the first bit is incorrect and the second bit is correct (e.g., 00 is misidentified as 10).

The V.27 ter modem at 2400 BPS uses differential coding. As indicated in FIG. 1, there is only one possible symbol at each phase. Therefore, an error which causes a symbol to be misidentified as another symbol will result in an error in the next symbol. This is because the initial error will cause the phase difference between these two symbols to be in error. For example, if a symbol with a phase of zero degrees is misidentified as a symbol having a phase of 90 degrees then the phase difference between this erroneous symbol and the next symbol having a phase of 90 degrees will, erroneously, be thought to have a phase difference of zero degrees. If no error were made, the phase difference would be 90 degrees.

The result is that four error patterns are possible when there is a one-bit error in a symbol (i.e., "-x" and "x-" for both the first and second symbol). These four error patterns are listed in FIG. 1.

Since the V.27 ter modem at 2400 BPS uses a descrambler that is described by the polynomial $1+(x^{}-6)+(x^{}-7)$, each error bit will result in an error in the sixth and seventh bits subsequently received. Note that an error bit is corrected if a second error (or an even number of errors) is made at the same bit location. FIG. 1 also lists the errors caused by the descrambler when presented with these four error patterns.

For the error pattern "-x-x," the sixth and seventh bits after the two erroneous bits will also be erroneous (i.e., "-x-x---xxxx"). The error pattern "-x-x" demonstrates what happens when two errors occur at the same bit location (i.e., "-xx----x-x--").

The four error patterns listed in FIG. 1 show that isolated symbol misidentification will result in clusters of bit errors with four or six incorrect bits over a range of up to eleven bits. Therefore, instead of doing an exhaustive search for all possible modifications that correct an erroneous symbol, the search is drastically reduced to either looking for the four error patterns listed in FIG. 1 at every symbol boundary (i.e., every two bits) or looking for the first three error patterns listed in FIG. 1 (the fourth error pattern is a shift of the first error pattern) at every bit location. If symbol boundaries are known, searching at these boundaries is preferred because fewer searches are required.

A second illustration of the present invention uses a V.27 ter modem at 4800 bits per second (BPS). This modem is also defined in 4800/2400 *Bits Per Second Modem Standardized For Use In The General Switched Telephone Network*, Recommendation V.27 ter of the International Telegraph and Telephone Consultive Committee (CCITT) of the International Telecommunication Union (ITU).

Figure 2:
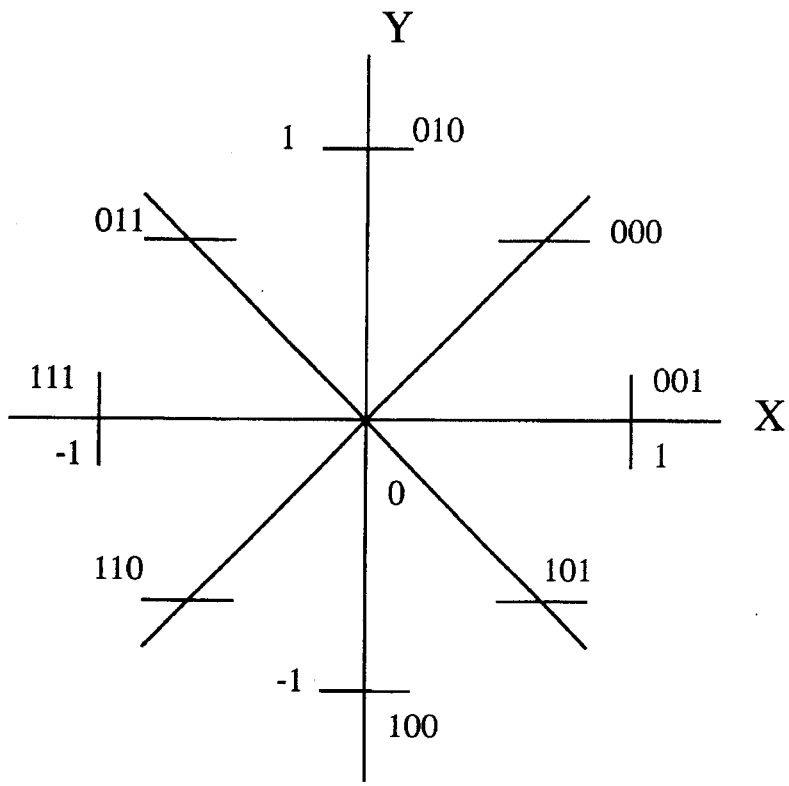
FIG. 2 illustrates the constellation and error patterns for a V.27 modem at 4800 bits per second.

The V.27 ter modem at 4800 BPS sends data as 8-Phase Shift Keyed (8PSK) which entails eight points in a constellation as illustrated in FIG. 2. These points can be envisioned as eight equally spaced points along a unit circle at 0 degrees, 45 degrees, 90 degrees, 135 degrees, 180 degrees, 225 degrees, 270 degrees, and 315 degrees. Each points is assigned a three bit symbol (i.e., 001, 000 010, 011, 111, 110, 100, and 101 respectively).

The distances between nearest neighbors is 0.77. The distance between non-nearest neighbors is 1.41, 1.85, or 2.00. Low noise will most likely cause a symbol to be misidentified as one of its nearest neighbors (i.e., a one-bit error). For example, if a zero degree point is misidentified, it will most likely be misidentified as either a 45 degree point or a 315 degree point.

Near-neighbor errors in a V.27 ter modem at 4800 BPS will cause one-bit errors in the three-bit symbol with three possible error patterns (i.e., "--x", "-x-", and "x--"). Since the V.27 ter modem at 4800 BPS uses differential encoding to indicate phase difference between a symbol and the subsequently sent symbol, an error in the first symbol will result in an error in the second. Therefore, there are nine possible error patterns (see FIG. 2).

Since the V.27 ter modem at 4800 BPS uses a descrambler that is described by the polynomial $1+(x^{}-6)+(x^{}-7)$, each error bit will result in an additional error in the sixth and seventh bits subsequently received (see FIG. 2). For the error pattern "-x--x", the sixth and seventh bits after each of the two erroneous bits will also be erroneous (i.e., "-x--x--xx-xx--").

The nine error patterns listed in FIG. 2 show that isolated symbol misidentification will result in clusters of bit errors with four or six incorrect bits over a range of up to thirteen bits. Therefore, instead of doing an exhaustive search for all possible modifications that correct an erroneous symbol, the search is drastically reduced to either looking for the nine error patterns listed in FIG. 2 at every symbol boundary (i.e., every three bits) or looking for the third, sixth, seventh, eighth, and ninth error patterns listed in FIG. 2 (the other error patterns are shifts of one of these five error patterns) at every bit location. If symbol boundaries are known, searching at these boundaries is preferred because fewer searches are required.

A third illustration of the present invention uses a V.29 modem at 7200 bits per second (BPS). This modem is defined in 9600 *Bits Per Second Modem Standardized For Use On Point-To-Point 4-Wire Leased Telephone-type Circuits*, Recommendation V.29 of the International Telegraph and Telephone Consultive Committee (CCITT) of the International Telecommunication Union (ITU).

Figure 3:
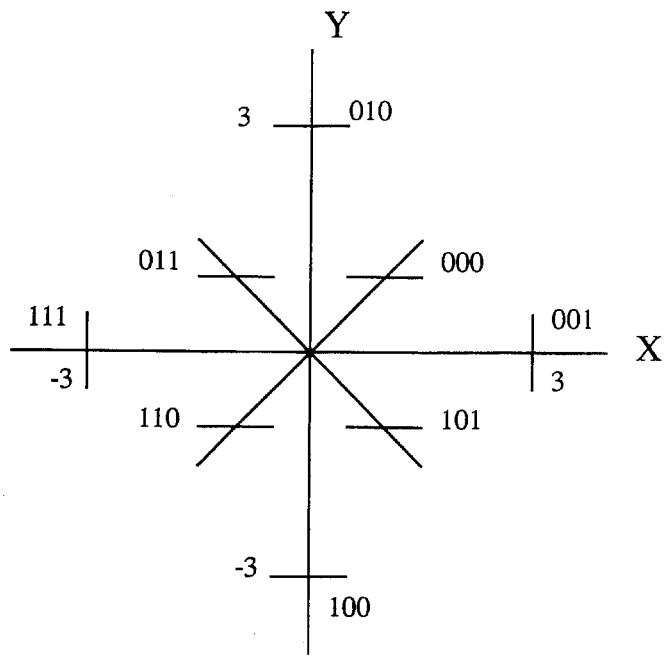
FIG. 3 illustrates the constellation and error patterns for a V.29 modem at 7200 bits per second.

The V.29 modem at 7200 BPS uses 8-Quadrature Amplitude Modulation (8QAM) which entails eight points in a constellation as illustrated in FIG. 3. The eight constellation points are at zero degrees, 90 degrees, 180 degrees, and 270 degrees on a circle of radius 3 and at 45 degrees, 135 degrees, 225 degrees, and 315 degrees on a circle of radius 1.41. A three-bit symbol is used to represent each constellation point. These constellation symbols are 001, 010, 111, 100, 000, 011, 110, and 101 respectively.

The distances between nearest-neighbor constellation points are 2.00 for points that are separated by 45 degrees and 2.24 for points separated by 90 degrees (i.e., the four inner symbols 000, 011, 110, and 101). A nearest-neighbor misidentification of a symbol (i.e., a 45 degree error) will result in a one-bit error in that symbol. A near-neighbor misidentification of an inner symbol with another inner symbol (i.e., a 90 degree error) will result in a two-bit error in that inner symbol (e.g., a inner-symbol misidentification may cause inner symbol 000 to be misidentified as either inner symbol 011 or inner symbol 101). The one-bit error will have one of three possible error patterns (i.e., "--x", "x--", or "-x-"). The two-bit error will have one of two possible error patterns (i.e., "-xx" or "x-x").

The V.29 modem at 7200 BPS uses a descrambling polynomial that can be described as $1+x^{}-18+x^{}-23$. Therefore, an error in a symbol will be extended by the descrambler to the eighteenth and twenty-third subsequently received bits. Because this modem uses differential coding, the five possible error patterns identified above will result in the thirteen error patterns listed in FIG. 3. These thirteen error patterns show that isolated symbol misidentification will result in clusters of bit errors with four, six, ten, or twelve incorrect bits over a range of up to twenty-nine bits. Therefore, instead of doing an exhaustive search for all possible modifications that correct an erroneous symbol, the search is drastically reduced to either looking for the thirteen error patterns listed in FIG. 3 at every symbol boundary (i.e., every three bits) or looking for the third, sixth, seventh, eighth, ninth, tenth, eleventh, twelfth, and thirteenth error patterns in FIG. 3 (the other error patterns are shifts of one of these nine error patterns) at every bit location. If symbol boundaries are known, searching at these boundaries is preferred because fewer searches are required.

A fourth, and last, illustration of the present invention uses a V.29 modem at 9600 bits per second (BPS). This modem, which is defined in 9600 *Bits Per Second Modem Standardized For Use On Point-To-Point 4-Wire Leased Telephone-type Circuits*, Recommendation V.29 of the International Telegraph and Telephone Consultive Committee (CCITT) of the International Telecommunication Union (ITU). It uses 16-Quadrature Amplitude Modulation (16QAM) which entails sixteen points in a constellation (see FIG. 4). The sixteen points are at zero degrees, 90 degrees, 180 degrees, and 270 degrees. There are two points at each of the following phases: zero degrees, 90 degrees, 180 degrees, and 270 degrees. Each of the two points at each phase is at a different radius (i.e., 3 and 5). Also, there are two points at each of the following phases: 45 degrees, 135 degrees, 225 degrees, and 315 degrees. Each of the two points at each phase are at a different radius (i.e., 1.41 and 4.24). A four-bit symbol is used to represent each constellation point. These symbols are 0001, 0010, 0111, 0100, 1001, 1010, 1111, 1100, 0000, 0011, 0110, 0101, 1000, 1011, 1110, and 1101 respectively. Distances between nearest constellation points are 2.00 and 2.24.

Figure 4:
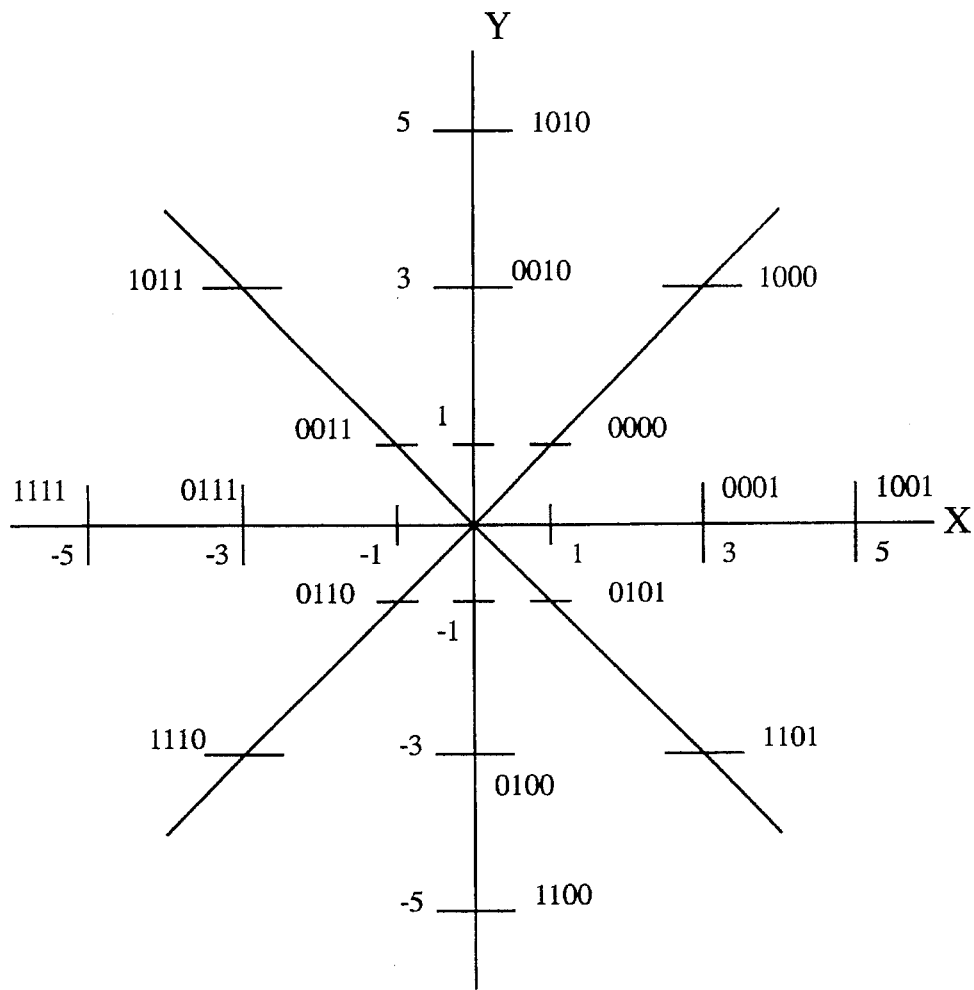
FIG. 4 illustrates the constellation and error patterns for a V.29 modem at 9600 bits per second.

The error that causes a misidentification between constellation points having the same phase (e.g., (3,0) and (5,0)) is an amplitude error which does not involve differential coding. Therefore, the symbol following the erroneously identified symbol is not, necessarily, erroneous. Since symbols at the same phase differ in only the first bit position, the only error associated with symbols at the same phase is "x---". And since the descrambler of the V.29 modem at 9600 BPS can be described by the polynomial $1+x^{}-18+x^{}-23$, the error pattern for symbol misidentification involving symbols at the same phase is as shown in FIG. 4 for the error "x---".

Errors between points at a radius of 1.41 (e.g. (1,1), (−1,1), (−1,−1), and (1,−1)), result in the subsequent symbol being erroneous because differential coding is used. These errors are of the form "--xx" and "-x-x". See FIG. 4 for the four error patterns that completely describe these errors.

Errors between points at a radius of 1.41 and points at a radius of three, which also involve differential coding, are of the form "---x", "--x-", and "-x--". Therefore, there are nine error patterns, as listed in FIG. 4, that completely describe these errors.

These fourteen error patterns show that isolated symbol misidentification will result in clusters of bit errors with three, four, six, ten, or twelve incorrect bits over a range of up to thirty bits. Therefore, instead of doing an exhaustive search for all possible modifications that correct an erroneous symbol, the search is drastically reduced to either looking for the fourteen error patterns listed in FIG. 4 at every symbol boundary (i.e., every four bits) or looking for every error pattern except the ninth, tenth, thirteenth, and fourteenth in FIG. 4 (the other error patterns are shifts of one of these ten error patterns) at every bit location. If symbol boundaries are known, searching at these boundaries is preferred because fewer searches are required. At high noise levels, other error patterns representing greater constellation distances may be observed. These additional error patterns will have varying probabilities of occurrence.

From the above examples, a method of correcting errors in formatted modem transmissions was developed. The method, which is illustrated in FIG. 5, consists of identifying the formatting scheme used by the transmitting modem. This step is easy if the type of transmitting modem is known (i.e., the formatting scheme is defined in the specification that defines the modem). If the type of modem is unknown, the received data must be compared to data structures that represent each of the known formatting schemes. The formatting scheme of the data structure that most closely resembles the received data defines the formatting scheme of the received data.

Next, the received data is checked to determine if any errors are contained therein. Any known method for detecting the presence of errors can be used. It is preferred that a test based on the data formatting scheme be used. For example, it is generally known that a cyclic redundancy check can be used to detect the presence of errors in data that is formatted into frames or packets. For facsimile data that contains a predetermined number of picture elements per line, only uses valid compression codes, uses an end-of-line code, and, in general, uses a high correlation of black picture elements from scan line to scan line (as does a Group 3 facsimile) the presence of these items can be checked to determine if the received data contains errors. Errors in ASCII data can be determined by checking to see that each symbol received has a value in the expected range. For example, if the text is solely uppercase letters then the twenty-six expected values are 65 to 90. The presence of any one of the other 230 ASCII values would indicate that an error is present in the uppercase text. If the text is alphanumeric, the range of expected values is 32 to 126 plus the value 13. Any other value present in an alphanumeric transmission would indicate that an error exists in the transmission. The present invention is not limited by the type of formatting scheme used. For each formatting scheme, it is believed that there is a test that can be used to determine if the received data follows that particular formatting scheme. If the received data does not follow the formatting scheme, the received data is believed to contain an error.

Once it is determined that the received data contains an error, the errors must be identified and corrected. Some prior art methods require that a bit, or bits, of the received data be toggled to determine if this would correct the error. Such an exhaustive-search method is extremely time consuming and may not be successful if the time to complete a search exceeds the mean time between failure of the device used to correct the errors.

The next step in the method is to generate the most likely error patterns that could be caused by the receiving modem and generate the correction pattern associated with each error pattern. The factors involved in determining these patterns include the most likely effects of noise (e.g., one-bit errors, two-bit errors, etc.) and the polynomial that describes the descrambler used in the receiving modem. These error patterns are generated as described in the above examples for the V.27 modem and V.29 modem at various transmission rates. These modems were used to demonstrate the error-pattern generation step. The present invention can be used with any modem and is not limited thereby.

After the most likely error patterns are generated, these error patterns are compared to the received data to determine the type and location of each error. This is the step that enables the present invention to either outperform an exhaustive-search method or correct errors where an exhaustive-search method might fail. Instead of making every possible modification to the received data and checking to see if each modification corrected the error, the present invention reduces error correction to a pattern recognition exercise using a list of error patterns that are a small subset of the bit modifications of the received data that are possible.

Once the type and location of each error is identified, each error is replaced with its associated correction pattern.

Compared to exhaustive-search methods, the present invention is highly efficient. If 400 bits were received from a V.29 modem at 9600 BPS, an exhaustive-search method would require a search of $3\times10^{}22$ twelve-bit blocks of the received data whereas the present invention only requires a search of 1400 fourteen-bit blocks if symbol boundary is known (4000 if symbol boundary is unknown). In this example, the present invention would outperform an exhaustive-search method by $10^{}19$ times. Similar efficiency improvements are found at other modem speeds and block sizes.

Figure 6:
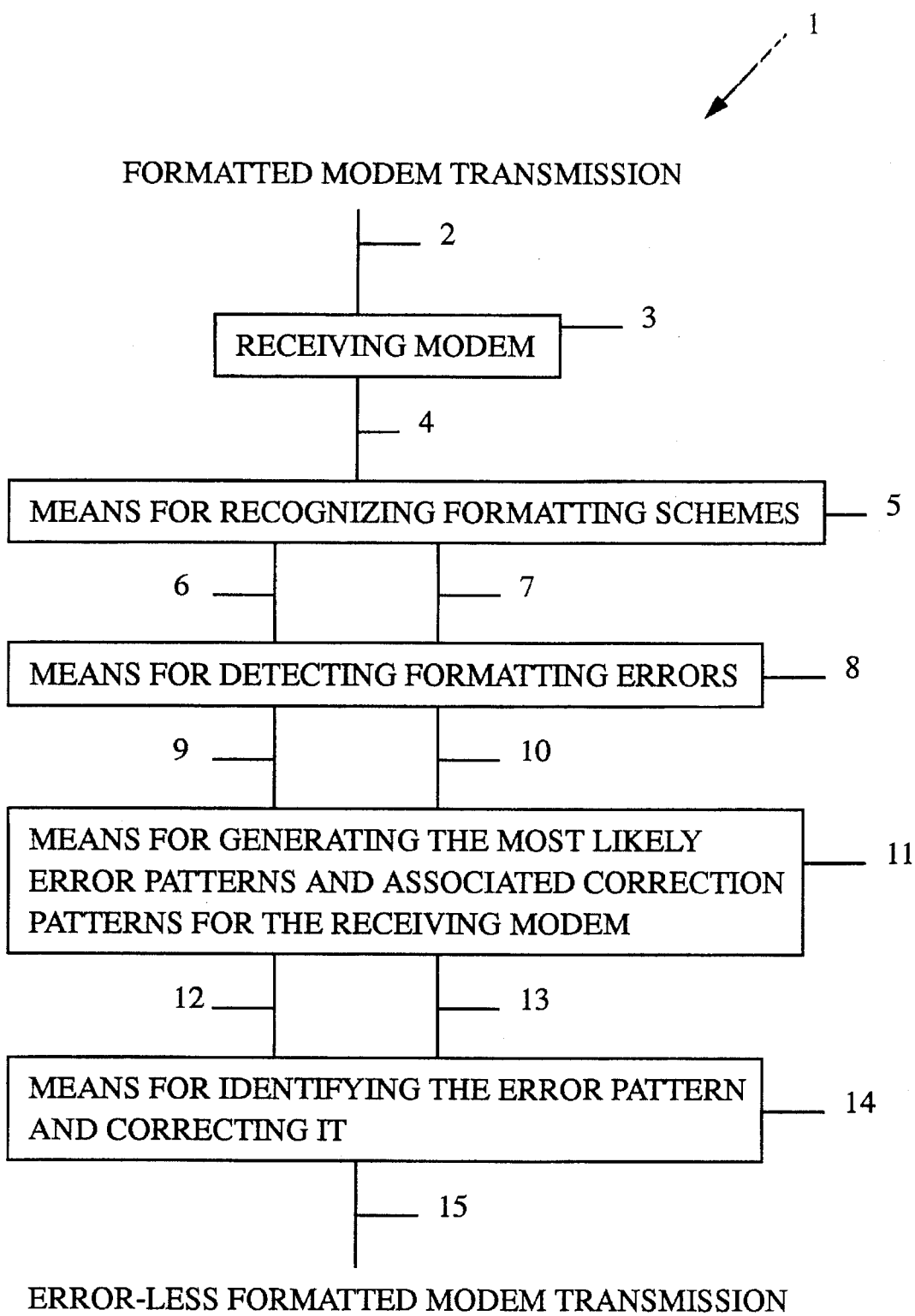
FIG. 6 is a schematic of the device of the present invention.

FIG. 6 illustrates one possible error-correction device 1 that embodies the steps of the method disclosed above. The error-correction device 1 receives a formatted modem signal at the input 2. The input signal 2 is connected to a receiving modem 3. The receiving modem 3, which can be any modem, has an output 4 for transmitting the input signal to a means for recognizing formatting schemes 5. The means for recognizing formatting schemes 5, as its name implies, is used to determine the formatting scheme of the input signal. One possible means for recognizing formatting schemes is to program a commercially available microprocessor to compare the input signal to all known formatting schemes. The microprocessor would score each known formatting scheme against the input signal and decide which one most closely matches the formatting scheme of the input signal. The microprocessor would then declare the input signal to have the same formatting scheme as the formatting scheme that it most closely matches. The means for recognizing formatting schemes 5 has a first output 6 and a second output 7. The first output 6 conveys the type of formatting scheme of the input signal to a means for detecting formatting errors 8. The second output 7 conveys the input signal to the means for detecting formatting errors 8.

The means for detecting formatting errors 8 is, as its name implies, a means for determining if any formatting errors exist in the input signal. The means for detecting formatting errors 8 can be realized with a commercially available microprocessor. The microprocessor is programmed to perform the test, or tests, known to detect formatting errors in a signal. See above for examples of some known tests such as cyclic redundancy checking, facsimile parameter checking, and ASCII value checking. The means for detecting formatting errors 8 has a first output 9 and a second output 10. The first output 9 conveys a signal that indicates the presence or absence of any formatting error in the received data to a means for generating the most likely error patterns and associated correction patterns for the receiving modem 11. The second output 10 conveys the input signal to the means for generating the most likely error patterns and associated correction patterns for the receiving modem 11.

The means for generating the most likely error patterns and associated correction patterns for the receiving modem 11 does as its name implies. A commercially available microprocessor can be programmed to generate these error patterns in the same manner as was done for the V.27 modem and the V.29 modem above. Error patterns for any modem can be generated. The associated correction patterns are the error patterns with the errors removed (i.e., the error patterns with the error bits toggled to the correct bits). The means for generating the error patterns 11 has a first output 12 and a second output 13. The first output 12 conveys the error patterns and the associated correction patterns to a means for identifying error patterns in the input signal and correcting the same 14. The second output 13 conveys the input signal to the means for identifying error patterns 14.

The means for identifying error patterns in the input signal and correcting the same 14 does what its name implies. A commercially available microprocessor can be programmed to compare the generated error patterns to the input signal to determine the type and location of any error pattern in the input signal. Upon determining the type and location of each error, each error pattern is replaced with its associated correction pattern. The means for identifying error patterns in the input signal and correcting the same 14 has an output signal 15 that conveys either the errorless input signal or the error-corrected input signal.

What is claimed is:

1. A method of correcting an error in a formatted modem transmission, comprising the steps of:
   a) receiving a formatted modem transmission into a receiving modem;
   b) identifying the formatting scheme of the transmission;
   c) testing the transmission to determine if a formatting error is contained therein;
   d) generating error patterns and associated correction patterns for the receiving modem based upon the format of the transmission and the type of descrambler used in the receiving modem;
   e) searching the transmission to determine if any of the generated error patterns is found therein; and
   f) replacing any error pattern found in the transmission with its associated correction pattern.

2. A method of correcting an error in a Quadrature Phase Shift Keyed formatted modem transmission, comprising the steps of:
   a) receiving a Quadrature Phase Shift Keyed formatted modem transmission into a receiving modem;
   b) testing the transmission to determine if a formatting error is contained therein;
   c) generating error patterns and associated correction patterns for the receiving modem based upon the Quadrature Phase Shift Keyed format and a descrambler that can be described by the polynomial $1+x^{}-6+x^{}-7$;
   d) searching the transmission to determine if any of the generated error patterns is found therein; and
   e) replacing any error pattern found in the transmission with its associated correction pattern.

3. A method of correcting an error in an 8-Phase Shift Keyed formatted modem transmission, comprising the steps of:
   a) receiving an 8-Phase Shift Keyed formatted modem transmission into a receiving modem;
   b) testing the transmission to determine if a formatting error is contained therein;
   c) generating error patterns and associated correction patterns for the receiving modem based upon the 8-Phase Shift Keyed format and a descrambler that can be described by the polynomial $1+x^{}-6+x^{}-7$;
   d) searching the transmission to determine if any of the generated error patterns is found therein; and
   e) replacing any error pattern found in the transmission with its associated correction pattern.

4. A method of correcting an error in an 8-Quadrature Amplitude Modulation formatted modem transmission, comprising the steps of:
   a) receiving an 8-Quadrature Amplitude Modulation formatted modem transmission into a receiving modem;
   b) testing the transmission to determine if a formatting error is contained therein;
   c) generating error patterns and associated correction patterns for the receiving modem based upon the 8-Quadrature Amplitude Modulation format and a descrambler that can be described by the polynomial $1+x^{}-18+x^{}-23$;
   d) searching the transmission to determine if any of the generated error patterns is found therein; and
   e) replacing any error pattern found in the transmission with its associated correction pattern.

5. A method of correcting an error in an 16-Quadrature Amplitude Modulation formatted modem transmission, comprising the steps of:

a) receiving an 16-Quadrature Amplitude Modulation formatted modem transmission into a receiving modem;

b) testing the transmission to determine if a formatting error is contained therein;

c) generating error patterns and associated correction patterns for the receiving modem based upon the 16-Quadrature Amplitude Modulation format and a descrambler that can be described by the polynomial $1+x^{}-18+x^{}-23$;

d) searching the transmission to determine if any of the generated error patterns is found therein; and e) replacing any error pattern found in the transmission with its associated correction pattern.

6. A device for correcting an error in a formatted modem transmission, comprising:

a) a modem for receiving a formatted modem transmission, having a descrambler that can be described by a polynomial;

b) a means for recognizing the formatting scheme of a formatted modem transmission connected to said receiving modem, where said format recognition means has a first output for conveying the format type and a second output for transmitting the received transmission;

c) a means for detecting formatting errors connected to said format recognition means, where said format-error detecting means has a first output for conveying the presence or absence of an error and a second output for transmitting the received transmission;

d) a means for generating error patterns and associated correction patterns connected to said formatting-error detection means, where the error patterns and associated correction patterns are based upon the format of the received transmission and the polynomial describing the descrambler of the receiving modem, where said error-pattern generating means has a first output for conveying the error patterns and the associated correction patterns and a second output for transmitting the received transmission; and e) a means for identifying and correcting an error, connected to said error-pattern generating means, having an output for transmitting an errorless received transmission.

* * * * *